US011034894B2

(12) United States Patent
Girard et al.

(10) Patent No.: US 11,034,894 B2
(45) Date of Patent: Jun. 15, 2021

(54) HYDRODESULPHURIZATION CATALYST SELECTIVE OF GASOLINES FROM FCC

(71) Applicant: IFP Energies Nouvelles, Rueil-Malmaison (FR)

(72) Inventors: Etienne Girard, Lyons (FR); Philibert Leflaive, Mions (FR); Christophe Vallee, St Genis Laval (FR); Isabelle Clemencon, Thurins (FR)

(73) Assignee: IFP Energies Nouvelles, Rueil-Malmaison (FR)

( * ) Notice: Subject to any disclaimer, the term of this patent is extended or adjusted under 35 U.S.C. 154(b) by 14 days.

(21) Appl. No.: 16/218,652

(22) Filed: Dec. 13, 2018

(65) Prior Publication Data

US 2019/0185764 A1 Jun. 20, 2019

(30) Foreign Application Priority Data

Dec. 14, 2017 (FR) ..................................... 1762158

(51) Int. Cl.
*C10G 45/08* (2006.01)
*B01J 23/755* (2006.01)
(Continued)

(52) U.S. Cl.
CPC .............. *C10G 45/08* (2013.01); *B01J 21/04* (2013.01); *B01J 23/75* (2013.01); *B01J 23/755* (2013.01); *B01J 23/88* (2013.01); *B01J 23/882* (2013.01); *B01J 23/888* (2013.01); *B01J 27/1853* (2013.01); *B01J 35/1014* (2013.01); *B01J 35/1019* (2013.01); *B01J 37/0018* (2013.01); *B01J 37/0203* (2013.01);
(Continued)

(58) Field of Classification Search
CPC . B01J 21/04; B01J 23/75; B01J 23/755; B01J 23/88; B01J 23/882; B01J 23/888; B01J 27/1853; B01J 35/1014; B01J 35/1019; B01J 37/0018; B01J 37/0203; B01J 37/0205; B01J 37/0207; B01J 37/024; B01J 37/08; B01J 37/20; B01J 37/28; B01J 31/0205; C10G 2300/202; C10G 2300/70; C10G 2400/02; C10G 45/08
USPC ........ 502/211, 213, 216, 221–223, 313–315; 208/209, 216 R, 217, 237, 123–124
See application file for complete search history.

(56) References Cited

U.S. PATENT DOCUMENTS 3,835,027 A * 9/1974 Ward ..................... C10G 47/20
208/111.1
4,490,480 A 12/1984 Lok
4,686,030 A 8/1987 Ward
5,223,472 A * 6/1993 Simpson .................. B01J 21/04
502/314
(Continued)

FOREIGN PATENT DOCUMENTS

EP 2816094 A1 12/2014

OTHER PUBLICATIONS

Search report in corresponding FR application 1762158 dated Aug. 16, 2018 (15 pages).

*Primary Examiner* — Patricia L. Hailey
(74) *Attorney, Agent, or Firm* — Millen, White, Zelano and Branigan, P.C.

(57) ABSTRACT

The present invention relates to a hydrotreating catalyst comprising at least one group VIB metal, at least one group VIII metal and an alumina support having a gamma alumina content greater than 50% by weight and less than 100% by weight with respect to the weight of the support, said support having a specific surface area comprised between 25 and 150 m$^2$/g.

16 Claims, 1 Drawing Sheet

(51) Int. Cl.
*B01J 27/185* (2006.01)
*B01J 37/02* (2006.01)
*B01J 37/08* (2006.01)
*B01J 37/20* (2006.01)
*B01J 35/10* (2006.01)
*B01J 21/04* (2006.01)
*B01J 23/888* (2006.01)
*B01J 23/88* (2006.01)
*B01J 23/882* (2006.01)
*B01J 37/00* (2006.01)
*B01J 23/75* (2006.01)
*B01J 37/28* (2006.01)
*B01J 31/02* (2006.01)

(52) U.S. Cl.
CPC ......... *B01J 37/024* (2013.01); *B01J 37/0205* (2013.01); *B01J 37/0207* (2013.01); *B01J 37/08* (2013.01); *B01J 37/20* (2013.01); *B01J 37/28* (2013.01); *B01J 31/0205* (2013.01); *C10G 2300/202* (2013.01); *C10G 2300/70* (2013.01); *C10G 2400/02* (2013.01)

(56) References Cited

U.S. PATENT DOCUMENTS

| | | | | |
|---|---|---|---|---|
| 5,888,380 | A * | 3/1999 | Fujita | B01J 35/10 208/251 H |
| 5,906,731 | A | 5/1999 | Abdo | |
| 9,731,283 | B2 * | 8/2017 | Cunningham | B01J 31/34 |
| 9,957,448 | B2 | 5/2018 | Gornay | |
| 10,464,054 | B2 * | 11/2019 | Carrette | C10G 45/12 |
| 2010/0093522 | A1 * | 4/2010 | Beeckman | B01J 23/85 502/185 |
| 2012/0145600 | A1 * | 6/2012 | Eijsbouts-Spickova | B01J 21/04 208/215 |
| 2012/0168347 | A1 * | 7/2012 | Eijsbouts-Spickova | B01J 23/88 208/46 |
| 2013/0008829 | A1 * | 1/2013 | Marchand | B01J 23/28 208/177 |
| 2015/0306580 | A1 * | 10/2015 | Daudin | B01J 35/1042 585/469 |
| 2015/0321177 | A1 | 11/2015 | Rana | |
| 2016/0001272 | A1 * | 1/2016 | Daudin | B01J 37/0236 585/638 |

* cited by examiner

HYDRODESULPHURIZATION CATALYST SELECTIVE OF GASOLINES FROM FCC

The present invention relates to a hydrotreating catalyst and a process for preparing said catalyst that is useful for the hydrodesulphurization of a petroleum cut, in particular a gasoline cut.

The invention also relates to a process for the hydrodesulphurization of a gasoline cut utilizing a catalyst according to the invention.

STATE OF THE ART

Petroleum refining as well as petrochemistry are now subject to new requirements. In fact, all countries are gradually adopting stringent sulphur specifications, with the aim of achieving for example 10 ppm (weight) of sulphur in commercial gasolines in Europe and Japan. The problem of reducing the sulphur contents essentially focuses on gasolines obtained by cracking, either catalytic (FCC Fluid Catalytic Cracking) or non-catalytic (coking, visbreaking, steam cracking), which are the main precursors of sulphur in gasoline pools.

One solution for reducing the sulphur content that is well known to a person skilled in the art consists of carrying out a hydrotreating (or hydrodesulphurization) of the hydrocarbon-containing cuts (and in particular gasolines from catalytic cracking) in the presence of hydrogen and a heterogeneous catalyst. However, this process has the major drawback of leading to a very significant fall of the octane rating if the catalyst utilized is not sufficiently selective. This reduction in the octane rating is in particular associated with the hydrogenation of the olefins present in this type of gasoline in a manner concomitant with hydrodesulphurization.

In contrast to other hydrotreating processes, the hydrodesulphurization of gasolines must thus make it possible to meet two contradictory requirements: to ensure deep hydrodesulphurization of the gasolines and to limit the hydrogenation of the unsaturated compounds present.

One means of addressing this dual problem consists of using hydrodesulphurization catalysts that are both active during hydrodesulphurization but also very selective during hydrodesulphurization with respect to the hydrogenation reaction of the olefins. Thus, the document US 2009/321320 is known in the state of the art, which discloses hydrodesulphurization catalysts which comprise an active cobalt/molybdenum metal phase and a support based on a high temperature alumina (i.e. calcined at a temperature greater than 800° C.) and containing less than 50% by weight of gamma, eta and chi alumina, and with a specific surface area comprised between 40 and 200 m$^2$/g. The catalysts are obtained by dry impregnation of an aqueous solution containing cobalt, molybdenum and at least one additive in the form of an organic compound.

Document EP 1892039 describes selective hydrodesulphurization catalysts comprising at least one support, at least one group VIII element, at least one group VIB element and phosphorus in which the support can be essentially constituted by at least one transition alumina, i.e. it comprises at least 51% by weight of transition alumina, said support capable of having a specific surface area less than 135 m$^2$/g. The exact crystallographic phase of the transition alumina is not disclosed. This document also discloses that the density of group VIB elements per unit of area of the support is comprised between $2.10^{-4}$ and $18.10^{-4}$ g of oxides of group VIB elements per m$^2$ of support.

Document WO2009/111720 discloses selective hydrodesulphurization catalysts having a specific surface area less than 100 m$^2$/g and an average pore diameter greater than 200 Å, the catalyst comprising cobalt, molybdenum, phosphorus and an alumina support mainly in the form of theta alumina and delta alumina.

Finally, document FR3023184 discloses dried selective hydrodesulphurization catalysts comprising a support based on alumina, at least one group VIB metal, at least one group VIII metal and phosphorus, and in which the specific surface area of the catalyst is comprised between 20 and 150 m$^2$/g and the density of the group VIB metal, expressed in the number of atoms of group VIB metal per unit of area of catalyst is comprised between 7 and 30 atoms of group VIB metal per nm$^2$ of catalyst. Preferably, the alumina is a delta, gamma, or theta alumina, alone or in a mixture. The specific surface area of the alumina support is generally comprised between 20 m$^2$/g and 200 m$^2$/g.

Gasoil hydrotreating catalysts are also known comprising a support, at least one group VIB metal associated with at least one group VIII metal which has a specific surface area comprised between 200 and 300 m$^2$/g and thus a group VIB metal density per unit of area, expressed as the number of atoms of group VIB metal per nm$^2$ of catalyst that is less than 7. The support used in the gasoil hydrotreating catalysts is generally a gamma alumina with a specific surface area greater than 200 m$^2$/g.

Thus, refiners are still currently very interested in hydrodesulphurization catalysts, in particular for gasoline cuts, which give improved catalytic performances, in particular in terms of catalytic activity in hydrodesulphurization and/or for selectivity, and which thus once utilized make it possible to produce a gasoline with a low sulphur content without a severe reduction in the octane rating.

SUMMARY OF THE INVENTION

The invention thus relates to a hydrotreating catalyst comprising at least one group VIB metal, at least one group VIII metal and an alumina support having a gamma alumina content greater than 50% by weight and less than 100% by weight with respect to the weight of the support, said support having a specific surface area comprised between 25 and 150 m$^2$/g.

According to a variant, the alumina support has a gamma alumina content comprised between 60% and 95% by weight with respect to the weight of the support.

According to a variant, the group VIB metal content is generally comprised between 3 and 35% by weight of oxide of said group VIB metal with respect to the total weight of the catalyst.

According to a variant, the group VIII metal content is generally comprised between 0.1 and 10% by weight of oxide of said group VIII metal with respect to the total weight of the catalyst.

According to a variant, the molar ratio (group VIII metal)/(group VIB metal) is comprised between 0.1 and 0.8.

According to a variant, the catalyst also contains phosphorus, the phosphorus content being comprised between 0.3 and 10% by weight expressed as P$_2$O$_5$ with respect to the total weight of the catalyst and the molar ratio of phosphorus/(group VIB metal) in the catalyst is comprised between 0.1 and 0.7.

According to a variant, the support has a specific surface area comprised between 60 and 100 m$^2$/g.

According to a variant, the density of group VIB metal, expressed as the number of atoms of group VIB metal per unit of area of the catalyst is comprised between 3 and 30 atoms of group VIB metal per nm² of the catalyst.

According to a variant, the group VIB metal is selected from tungsten and molybdenum and the group VIII metal is selected from nickel and cobalt.

According to a variant, the alumina support is obtained by heat treatment from a precursor of alumina at a temperature less than or equal to 770° C.

According to a variant, the catalyst also comprises at least one organic compound containing oxygen and/or nitrogen.

According to this variant, the organic compound is selected from a carboxylic acid, an alcohol, an aldehyde, an ester, an amine, an amino carboxylic acid, an amino alcohol, a nitrile and an amide.

According to this variant, the organic compound is selected from γ-valerolactone, 2-acetylbutyrolactone, triethylene glycol, diethylene glycol, ethylene glycol, ethylenediaminetetraacetic acid (EDTA), maleic acid, malonic acid, citric acid, γ-ketovaleric acid, dimethylformamide, N-methylpyrrolidone, propylene carbonate, 2-methoxyethyl 3-oxobutanoate, 2-(methacryloyloxy)ethyl 3-oxobutanoate, bicine, or tricine.

According to a variant, the catalyst is sulphurized.

The invention also relates to a process for preparing the hydrotreating catalyst according to the invention comprising the following stages:
  a) carrying out a heat treatment at a temperature less than or equal to 770° C. of a precursor of alumina so as to obtain a support containing a gamma alumina content greater than 50% by weight and less than 100% by weight with respect to the weight of the support, said support having a specific surface area comprised between 25 and 150 m²/g,
  b) bringing at least one component of a group VIB metal, at least one component of a group VIII metal and optionally phosphorus into contact with said support, so as to obtain a catalyst precursor,
  c) drying said catalyst precursor originating from stage b) at a temperature less than 200° C.

According to a variant, stage a) of heat treatment is carried out from a precursor of alumina containing at least 50% by weight of boehmite AlOOH with respect to the total weight of the precursor of alumina.

According to a variant, the preparation process also comprises a stage d) of calcination at a temperature comprised between 200° C. and 600° C. carried out after stage c).

According to a variant, the preparation process also comprises a stage of sulphurization carried out after stage c) or d).

Finally, a subject of the invention is also a process for the hydrodesulphurization of a gasoline cut in which said gasoline cut, hydrogen and a catalyst according to the invention that has been sulphurized are brought into contact. These are brought into contact at:
  a temperature comprised between 200° C. and 400° C.;
  a total pressure comprised between 1 and 3 MPa;
  an hourly space velocity, defined as being the volume flow rate of feedstock with respect to the volume of catalyst, comprised between 1 and 10 h⁻¹;
  a ratio by volume of hydrogen/gasoline feedstock comprised between 100 and 600 Nl/l.

The gasoline which is treated by the hydrodesulphurization process is preferably a gasoline originating from a catalytic cracking unit.

Hereinafter, the groups of chemical elements are given according to the CAS classification (CRC Handbook of Chemistry and Physics, publisher CRC Press, editor in chief D. R. Lide, 81st edition, 2000-2001). For example, according to the CAS classification, the group VIII corresponds to the metals of columns 8, 9 and 10 according to the new IUPAC classification.

DETAILED DESCRIPTION OF THE INVENTION

Catalyst

The applicant has thus discovered that a hydrotreating catalyst comprising at least one group VIB metal, at least one group VIII metal and an alumina support having a gamma alumina content greater than 50% by weight and less than 100% by weight with respect to the weight of the support, said support having a specific surface area comprised between 25 and 150 m²/g has, after sulphurization, not only a maintained hydrodesulphurization activity, but also has a significant increase in hydrodesulphurization selectivity with respect to the hydrogenation reaction of the olefins.

Surprisingly, the applicant has established that a catalyst corresponding to the characteristics mentioned above and containing in particular an alumina support having a gamma alumina content greater than 50% by weight and less than 100% by weight with respect to the weight of the support while having a specific surface area that is unusually low for a support containing mainly gamma alumina has a high hydrodesulphurization activity while being more selective with respect to the hydrogenation reaction of the olefins. In fact, the majority of the catalysts used in hydrotreating gasoline cuts disclose alumina supports having a specific surface area comparable to that of the invention, but having a crystallographic phase that is mainly theta, delta, kappa and/or alpha alumina. Conversely, the gamma alumina-based catalysts known from the prior art and often used for hydrotreating a gasoil cut generally show higher specific surface areas.

The catalyst according to the invention shows an improved hydrodesulphurization selectivity with respect to the hydrogenation of the olefins, thus conferring a property that is advantageous in the context of hydrotreating hydrocarbon cuts of the gasoline type (i.e. having a boiling point generally comprised between 30° C. and 250° C.) containing olefins, in which minimization of the hydrogenation reaction of the olefins is sought in order to limit the loss of octane rating of the gasoline treated.

According to a first aspect of the invention, the catalyst according to the invention is composed of a specific alumina support and an active phase formed of at least one group VIB metal and at least one group VIII metal and optionally phosphorus.

The catalyst support according to the invention is an alumina support having a gamma alumina content greater than 50% by weight and less than 100% by weight with respect to the weight of the support, preferably having a gamma alumina content comprised between 60% and 95% by weight. The alumina support can also contain delta, theta and/or alpha alumina.

The composition of the alumina in gamma crystallographic phase is determined by XRD powder analysis of the support.

The term "transition alumina" covers a set of crystallographic states which depend on the precursor and on the heat treatment applied during the manufacture of the alumina (see in particular the article by P. Souza Santos et al. "Standard Transition Aluminas. Electron Microscopy Studies", Materials Research, Vol. 3, No. 4, 104-114, 2000). These crystallographic states are characterized by different parameters, i.e. the crystallographic system (cubic, tetragonal, monoclinic) and the lattice parameters of the solid. Three defined types of transition alumina used as catalyst supports, corresponding to three different crystallographic systems can be obtained from boehmite: gamma, delta and theta. The domains of definition of these aluminas are a function of the type of boehmite used and of the heat treatment applied. In reality, the aluminas obtained are often mixtures of two or more types.

The alumina obtained at low temperature (less than 550° C.) is called "cubic gamma". The beams that are characteristic of this type of alumina, the conformance factor of which depends essentially on the well-defined atomic positions of oxygen in the lattice of cubic gamma alumina, such as the beams [400] and [440], are relatively narrow, symmetrical, and the width thereof is mainly associated with the size of the crystallites. In fact, this alumina only has a reduced domain of definition and extends over a continuum of solids that are more or less tetragonal up to the formation of delta alumina.

A heat treatment of the gamma and delta alumina at a higher temperature enables the transition towards theta alumina then towards the final alpha phase that is thermodynamically stable.

In order to extract the information contained in the diffraction diagram of the transition alumina about the nature, degree of evolution, and size of the crystallites thereof, the applicant has defined a protocol for processing the diffracted profile that is as robust as possible. This processing is described below.

Figure 1:
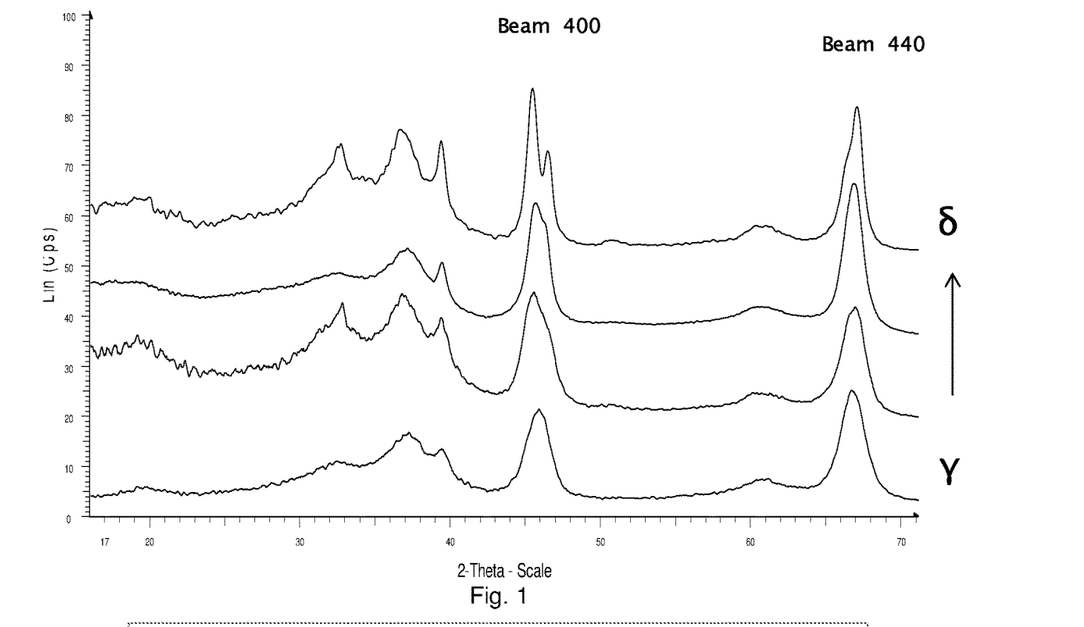

The diagram of the delta alumina is distinguished from that of the gamma alumina by a general narrowing of the beams, relative changes in intensity and above all by a splitting of the two beams 400 and 440 (FIG. 1). Studying the profile of the beam 440 gives the ratio of the two dimensions a and c' (c"/3 i.e. approximately 7.83 Å). In general, diffractograms highlighting a "pure" gamma alumina or a "pure" delta alumina as described above are relatively rare cases and the decomposition of the boehmite and/or the calcination of a gamma alumina give rise to a continuum of more or less quadratic phases, not categorically set out.

A splitting of the beams 400 and 440 of the cubic gamma alumina can be seen quite clearly. From the profiles of these beams, the relative proportion of the gamma and delta alumina are estimated.

The conditions used for recording diffractograms of the supports of the present invention are given in the table below:

| Diffractometer | PANalytical X'Pert Pro ™ |
|---|---|
| Configuration | Reflection (Bragg-Brentano geometry) |
| X-ray source | Copper ($\lambda_{K\alpha 1}$ = 1.5406 Å) |
| Operating power | 35 mA × 35 KV |
| Acquisition parameters | Scan range (in °2θ): 5 to 75° 2θ |
| | Step size (in °): 0.05° |
| | Collection time (in s): 700 s |
| | Scan speed: 2 h 15 |
| | Optics: Variable slits + rear monochromator |
| | Detector: X'celerator (scanning mode 2,122°) |
| Preparation of the samples | grinding and compacting of the powder in a "conventional" sample holder |

The peak 440 (centred on a position of 67° 2θ) is used, comparing it to a single, asymmetrical profile, in order to quantify the proportion of γ and δ aluminas. In order to limit the degrees of freedom of the adjustment, a function of the pseudo-Voigt type, with a parameter η (which in this function defines the Gaussian or Lohrentzian proportion) fixed at a value of 0.5 is used. The two semi-profiles are adjusted separately and the parameter which defines the asymmetry is the ratio of the two semi-widths at the mid-height.

$$A_{sym} = \frac{\text{left semi-width}}{\text{right semi-width}}$$

Figure 2:
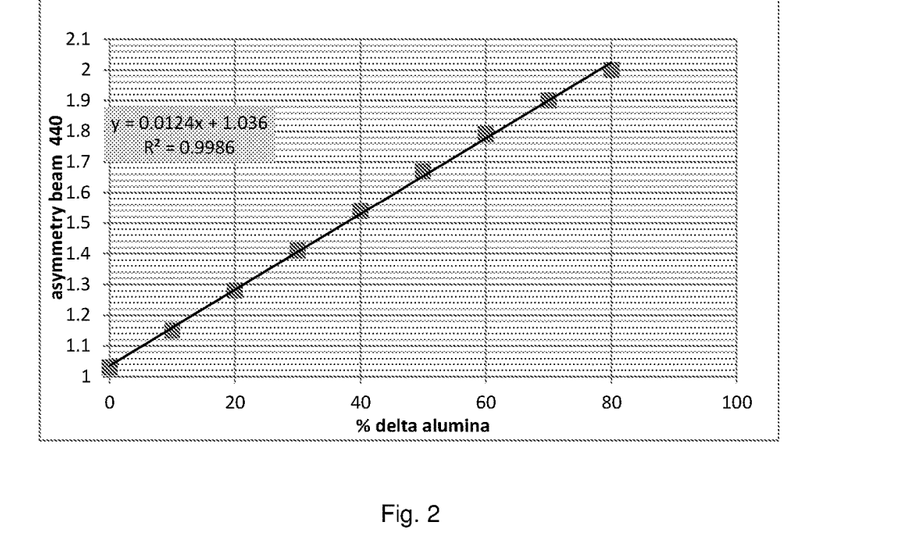

The relative proportion of γ and δ alumina is then established using the correlation in FIG. 2, which associates the asymmetry of the beam 440 with the proportion of δ alumina.

On the diffractogram, the optional presence of beams characteristic of other aluminas such as θ and α aluminas can be detected. Quantification of the proportion thereof can be carried out by measuring the area of the beams using for comparison pure samples of these aluminas available at the XRD laboratory. Thus, quantification of the θ alumina fraction is carried out based on a pure sample of θ alumina by selecting isolated θ alumina beams at different angles (30-35°, 51°, 73° and 108°) and quantification of the fraction of α alumina is carried out from a pure sample of a alumina by selecting isolated α alumina beams at different angles (25.55°, 43.4°, 52.55° and 57.50°).

The specific surface area of the gamma alumina support is generally comprised between 25 m²/g and 150 m²/g, preferably between 40 m²/g and 120 m²/g, and more preferably between 60 m²/g and 100 m²/g. The specific surface area is determined in the present invention by the B.E.T. method according to standard ASTM D3663, as described in the work Rouquerol F.; Rouquerol J.; Singh K. "*Adsorption by Powders & Porous Solids: Principle, methodology and applications*", Academic Press, 1999, for example by means of a model Autopore III™ apparatus with the trade mark Micromeritics™.

The pore volume of the alumina support is generally comprised between 0.4 cm³/g and 1.3 cm³/g, preferably comprised between 0.6 cm³/g and 1.1 cm³/g. The total pore volume is measured by mercury porosimetry according to standard ASTM D4284 with a wetting angle of 140°, as described in the same work.

The alumina-based porous solid used as support is advantageously in the form of a powder, or in the form of beads, extrudates, pellets, or irregular, non-spherical agglomerates, the specific form of which may result from a crushing stage.

The catalyst according to the invention also comprises an active phase formed from at least one group VIB metal and at least one group VIII metal. The catalyst according to the invention can optionally comprise phosphorus.

The total group VIII metal content is comprised between 0.1 and 10% by weight of the group VIII metal oxide with respect to the total weight of catalyst, preferably comprised between 0.6 and 8% by weight, preferably comprised between 2 and 7%, very preferably comprised between 2 and 6% by weight and even more preferably comprised between 3 and 6% by weight of group VIII metal oxide with respect to the total weight of the catalyst.

The group VIB metal content is comprised between 3 and 35% by weight of group VIB metal oxide with respect to the total weight of catalyst, preferably comprised between 5 and 30% by weight, preferably comprised between 7 and 28% by weight, very preferably comprised between 10 and 25% by weight of group VIB metal oxide with respect to the total weight of the catalyst.

When phosphorus is present, the catalyst according to the invention has a phosphorus content generally comprised between 0.3 and 10% by weight of $P_2O_5$ with respect to the total weight of catalyst, preferably between 2 and 8% by weight of $P_2O_5$ with respect to the total weight of catalyst. For example, the phosphorus present in the catalyst is combined with the group VIB metal and optionally also with the group VIII metal in the form of heteropolyanions.

The hydrotreating catalyst according to the invention, in oxide form, is characterized by a specific surface area comprised between 20 and 150 m²/g, preferably comprised between 30 and 120 m²/g, preferably comprised between 40 and 95 m²/g, very preferably comprised between 50 and 90 m²/g.

Moreover, the catalyst has a density of group VIB metal, expressed as the number of atoms of said metal per unit of area of the catalyst, which is comprised between 3 and 30 atoms of group VIB metal per nm² of catalyst, preferably comprised between 3 and 25 atoms of group VIB metal per nm² of catalyst and very preferably comprised between 3.5 and 20 atoms of group VIB metal per nm² of catalyst. Even more preferably, the density of group VIB metal, expressed as the number of atoms of said group VIB metal per unit of area of the catalyst is comprised between 4 and 15 atoms of group VIB metal per nm² of catalyst. The density of group VIB metal, expressed as the number of atoms of group VIB metal per unit of area of the catalyst (number of atoms of group VIB metal per nm² of catalyst) is calculated for example from the following relationship:

$$d \text{ (group } VIB \text{ metal)} = \frac{(X \times N_A)}{(100 \times 10^{18} \times S \times M_M)}$$

with:
X=% by weight of group VIB metal;
$N_A$=Avogadro's number equal to $6.022 \cdot 10^{23}$;
S=Specific surface area of the catalyst (m²/g), measured according to standard ASTM D3663;
$M_M$=Molar mass of group VIB metal (for example 95.94 g/mol for molybdenum).

By way of example, if the catalyst contains 20% by weight of molybdenum oxide $MoO_3$ (i.e. 13.33% by weight of Mo) and has a specific surface area of 100 m²/g, the density of (Mo) is equal to:

$$d \text{ (}Mo\text{)} = \frac{(13.33 \times N_A)}{(100 \times 10^{18} \times 100 \times 96)} = 8.3 \text{ atoms of } Mo/\text{nm}^2 \text{ of catalyst}$$

The molar ratio of group VIII metal to group VIB metal of the catalyst is generally comprised between 0.1 and 0.8, preferably comprised between 0.2 and 0.6.

Moreover, the molar ratio of phosphorus/(group VIB metal) is generally comprised between 0.1 and 0.7, preferably comprised between 0.2 and 0.6, when phosphorus is present.

The group VIB metal present in the active phase of the catalyst is preferentially selected from molybdenum and tungsten.

The group VIII metal present in the active phase of the catalyst is preferentially selected from cobalt, nickel and the mixture of these two elements.

The active phase of the catalyst is selected preferably from the group formed by the combination of the elements nickel-molybdenum, cobalt-molybdenum and nickel-cobalt-molybdenum and very preferably the active phase is constituted by cobalt and molybdenum.

BRIEF DESCRIPTION OF THE DRAWINGS

The diagram of the delta alumina is distinguished from that of the gamma alumina by a general narrowing of the beams, relative changes in intensity and above all by a splitting of the two beams 400 and 440 (FIG. 1). The relative proportion of γ and δ alumina is then established using the correlation in FIG. 2, which associates the asymmetry of the beam 440 with the proportion of δ alumina.

PREPARATION PROCESS

The catalyst according to the invention may be prepared by any preparation mode known to a person skilled in the art.

According to a second aspect of the invention, the invention relates to a process for preparing a catalyst according to the invention utilizing a stage of heat treatment of a precursor of alumina so as to obtain an alumina support having a gamma alumina content greater than 50% by weight and less than 100% by weight with respect to the weight of the support, said support having a specific surface area comprised between 25 and 150 m²/g.

More particularly, the invention also relates to a process for preparing the hydrotreating catalyst according to the invention comprising the following stages:
  a) carrying out a heat treatment at a temperature less than or equal to 770° C. of a precursor of alumina so as to obtain a support having a gamma alumina content greater than 50% by weight and less than 100% by weight with respect to the weight of the support, said support having a specific surface area comprised between 25 and 150 m²/g.
  b) bringing at least one component of a group VIB metal, at least one component of a group VIII metal and optionally phosphorus into contact with said support, so as to obtain a catalyst precursor;
  c) drying said catalyst precursor originating from stage b) at a temperature less than 200° C.

The precursor of alumina used in the stage a) of preparing the catalyst can be obtained according to different embodiments.

According to an embodiment, the precursor of alumina used in the stage a) of preparing the catalyst can be obtained from aluminium salts such as aluminium chloride, aluminium nitrate, aluminium sulphate or sodium aluminate. Preparing the precursor of alumina thus involves a precipitation reaction between one or more aluminium salts and optionally one or more acids (for example nitric acid, sulphuric acid, hydrochloric acid, etc.) or one or more bases (for example, soda, potassium hydroxide, ammonia, etc.). According to one of the embodiments, the suspension obtained at the precipitation stage is subjected directly to a heat treatment in liquid phase, with a temperature comprised between 80° C. and 300° C. and a duration comprised between 30 minutes and 2 weeks. Optionally, one or more acids and one or more bases can be added to the suspension before the heat treatment. According to another embodiment, the suspension obtained at the precipitation stage is subjected to a stage of solid-liquid separation and optionally to washing. The solid fraction is then re-suspended in a solvent and subjected to a heat treatment in liquid phase, with a temperature comprised between 80° C. and 300° C. and a duration comprised between 30 minutes and 2 weeks. Optionally, one or more acids and one or more bases can be added to the re-suspended solid fraction before the heat treatment. At the end of the stage of heat treatment, one or more stages of solid-liquid separation and/or drying (for example by spray-drying) and/or forming (for example by granulation, mixing-extrusion, oil-drop, pelletization, etc.) make it possible to obtain the precursor of alumina. Examples of preparing the precursor of alumina according to this preferred embodiment can be found in T. HE et al. Materials Let. 62 (2008) 17-17, 2939-2942 or in D. Yida et al. Ceramics Inter. 36 (2010) 1773-1777.

According to another particular embodiment of the invention, the precursor of alumina used according to the present invention can be obtained from aluminium alcoholates such as $Al(O-Et)_3$, $Al(O-iPr)_3$, $Al(O-secBu)_3$, $Al(O-nBu)_3$, $Al(O-R)_3$ with R being a linear alkyl chain containing between 6 and 18 carbon atoms. Preparation of the precursor of alumina thus involves a hydrolysis reaction of one or more aluminium alcoholates. According to one of the embodiments of the invention, the medium obtained at the hydrolysis stage is subjected directly to a heat treatment in liquid phase, with a temperature comprised between 80° C. and 300° C. and a duration comprised between 30 minutes and 2 weeks. Optionally, one or more acids and one or more bases can be added to the medium obtained at the hydrolysis stage before the heat treatment. According to another embodiment of the invention, the medium obtained at the hydrolysis stage is subjected to a stage of solid-liquid separation (and optionally washing) then the solid fraction is re-suspended and subjected to a heat treatment in liquid phase, with a temperature comprised between 80° C. and 300° C. and a duration comprised between 30 minutes and 2 weeks. Optionally, one or more acids and one or more bases can be added to the re-suspended solid fraction before the heat treatment. According to another embodiment, the medium obtained at the hydrolysis stage is subjected to a stage of separation of an organic liquid phase and an aqueous suspension, then the aqueous suspension is subjected to a heat treatment in liquid phase, with a temperature comprised between 80° C. and 300° C. and a duration comprised between 30 minutes and 2 weeks. Optionally, one or more acids and one or more bases can be added to the aqueous suspension before the heat treatment. According to another embodiment, the medium obtained at the hydrolysis stage is subjected to a stage of evaporation of the organic solvent, then the aqueous fraction is subjected to a heat treatment in liquid phase, with a temperature comprised between 80° C. and 300° C. and a duration comprised between 30 minutes and 2 weeks. Optionally, one or more acids and one or more bases can be added to the aqueous fraction before the heat treatment. At the end of the stage of heat treatment, one or more stages of solid-liquid separation and/or drying (for example by spray-drying) and/or forming (for example by granulation, mixing-extrusion, oil-drop, pelletization, etc.) make it possible to obtain the precursor of alumina. Examples of preparing the precursor of alumina according to this preferred embodiment can be found in A. Meyer et al. U.S. Pat. No. 5,055,019 or in K. Noweck et al. U.S. Pat. No. 8,414,854.

According to another particular embodiment of the invention, the precursor of alumina can be obtained from a powder composed of boehmite, gibbsite, bayerite, diaspore, chi alumina, kappa alumina, eta alumina, gamma alumina, delta alumina or a mixture of these different oxides. The preparation of the precursor of alumina thus involves the re-suspension in water of this powder, then a stage of heat treatment at a temperature comprised between 80° C. and 300° C. and for a duration comprised between 30 minutes and 2 weeks. Optionally, one or more acids and one or more bases can be added to the aqueous suspension before the heat treatment. At the end of the stage of heat treatment, one or more stages of solid-liquid separation and/or drying (for example by spray-drying) and/or forming (for example by granulation, mixing-extrusion, oil-drop, pelletization, etc.) make it possible to obtain the precursor of alumina. Examples of preparing the precursor of alumina according to this preferred embodiment can be found in J.-C. Li et al. App. Surface Sc. 253 (2006) 766-770 or in L. Guangci et al. App. Catal. A 437-438 (2012) 79-80.

According to another particular embodiment of the invention, the precursor of alumina can be obtained from objects of millimetric size (defined as objects having at least one dimension greater than 0.5 mm) in the form of beads, extrudates or pellets. These solids can be boehmite, gibbsite, bayerite, diaspore, chi alumina, kappa alumina, eta alumina, gamma alumina, delta alumina compounds or a mixture of these different oxides. The preparation of the precursor of alumina thus involves a stage of autoclaving the objects of millimetric size at a temperature comprised between 80° C. and 300° C. and a duration comprised between 30 minutes and 2 weeks. The term autoclaving here denotes treatment under saturation vapour pressure or under a partial water vapour pressure at least equal to 70% of the saturation vapour pressure corresponding to the treatment temperature. Optionally, the objects of millimetric size can be impregnated with water or acid or base aqueous solutions before the stage of autoclaving. This impregnation, before the stage of autoclaving, can be carried out dry or by immersing the objects of millimetric size in an acid or base aqueous solution. By dry impregnation, is meant bringing the objects of millimetric size into contact with a volume of solution less than or equal to the water uptake volume thereof. Preferably, impregnation is carried out dry. Examples of preparing the precursor of alumina according to this preferred embodiment can be found in A. A. Lamberov et al. Russ. *J. Appl. Chem.* 87 (2014) 6, 676-683 or A. Stanislaus et al. *J. Mol. Catal. A* 181 (2002) 33-39 or J. L. Le Loarer et al. FR2823193.

In general, and for all of the embodiments described above, the stages of heat treatment or autoclaving are generally carried out at a temperature comprised between 80° C. and 300° C., preferably comprised between 120 and 250° C. The stages of heat treatment or autoclaving are generally carried out for a duration comprised between 30 minutes and 2 weeks, preferably comprised between 1 hour and 48 hours.

Preferably, the acids added before the stage of heat treatment or impregnated on the support before the stage of autoclaving are selected from nitric, hydrochloric, sulphuric, perchloric, phosphoric, formic or acetic acid.

Preferably, the bases added before the stage of heat treatment or impregnated on the support before the stage of autoclaving are selected from soda, potassium hydroxide, ammonia, tetraethylammonium hydroxide and triethylamine.

According to a preferred embodiment, the precursor of alumina obtained comprises a precursor of the aluminium oxy(hydroxide) (AlO(OH)) type—also denoted boehmite. Preferably, the precursor of alumina contains at least 50% by weight of boehmite AlOOH with respect to the total weight of the precursor of alumina. Particularly preferably, the precursor of alumina consists of boehmite.

Stage a) of Heat Treatment

The precursor of alumina is optionally dried before undergoing the heat treatment. For example, drying is carried out at a temperature comprised between 100 and 200° C.

The dried precursor of alumina then undergoes a stage of heat treatment at a temperature less than or equal to 770° C. which makes it possible to give it physical properties corresponding to the envisaged application. More particularly, the precursor of alumina thus obtained is then subjected to a heat treatment at a temperature less than or equal to 770° C., preferably comprised between 500° C. and 770° C., and particularly preferably comprised between 550° C. and 750° C., so as to obtain a support having a gamma alumina content greater than 50% by weight and less than 100% by weight with respect to the total weight of the support, said support having a specific surface area comprised between 25 and 150 m²/g.

Preferably, the support is prepared by heat treatment at a temperature less than or equal to 770° C., and preferably comprised between 500° C. and 770° C., and particularly preferably comprised between 550° C. and 750° C. of a precursor of alumina containing at least 50% by weight of boehmite AlOOH with respect to the total weight of the precursor of alumina.

Preferably, the heat treatment is carried out for a duration comprised between 1 and 8 hours under air. Optionally, the air can contain a water content generally comprised between 0 and 50% by weight.

At the end of the heat treatment stage a) of the process of preparation of the catalyst according to the invention, an alumina support is obtained having a gamma alumina content greater than 50% by weight and less than 100% by weight with respect to the weight of the support, said support having a specific surface area comprised between 25 and 150 m²/g.

Stage b) Introduction of the Active Phase

According to stage b) of the process of preparing the catalyst according to the invention, at least one group VIB metal component, at least one group VIII metal component, and optionally phosphorus are brought into contact with the support, so as to obtain a catalyst precursor.

The stage b) of bringing the support into contact comprises several embodiments. According to a first embodiment of stage b) of the process for the preparation of the catalyst, said group VIB, group VIII metal components and optionally phosphorus are deposited on said support, by one or more stages of co-impregnation, i.e. said components of the group VIB metals, of the group VIII metals and optionally phosphorus are introduced simultaneously into said support. The stage or stages of co-impregnation is (are) preferably carried out by dry impregnation or by impregnation with excess of solution. When this first embodiment comprises the utilization of several co-impregnation stages, each stage of co-impregnation is preferably followed by an intermediate drying stage generally at a temperature less than 200° C., advantageously comprised between 50 and 180° C., preferably between 60 and 150° C., very preferably between 75 and 140° C.

According to a preferred embodiment by co-impregnation, the impregnation solution is preferably an aqueous solution. Preferably, the aqueous impregnation solution when it contains cobalt, molybdenum and phosphorus is prepared under pH conditions promoting the formation of heteropolyanions in solution. For example, the pH of one such aqueous solution is comprised between 1 and 5.

According to a second embodiment of stage b) of the process for preparing the catalyst, the catalyst precursor is prepared by proceeding to the successive depositions in any order of a group VIB metal component, a group VIII metal component and optionally phosphorus on said support. The depositions can be carried out by dry impregnation, by impregnation in excess or also by deposition-precipitation according to methods that are well known to a person skilled in the art. In this second embodiment, the deposition of the components of the group VIB and VIII metals and optionally phosphorus can be carried out by means of several impregnations with an intermediate drying stage between two successive impregnations, generally at a temperature less than 200° C., advantageously comprised between 50 and 180° C., preferably between 60 and 150° C., very preferably between 75 and 140° C.

Regardless of the mode of deposition of the metals and of the optional phosphorus utilized, the solvent forming part of the composition of the impregnation solutions is selected so as to solubilize the metal precursors of the active phase, such as water or an organic solvent (for example an alcohol).

By way of example, among the sources of molybdenum, the oxides and hydroxides, the molybdic acids and salts thereof can be used, in particular the ammonium salts such as ammonium molybdate, ammonium heptamolybdate, phosphomolybdic acid ($H_3PMo_{12}O_{40}$) and salts thereof, and optionally silicomolybdic acid ($H_4SiMo_{12}O_{40}$) and salts thereof. The sources of molybdenum may also be any heteropoly compound of the Keggin, lacunar Keggin, substituted Keggin, Dawson, Anderson, or Strandberg type, for example. Molybdenum trioxide and the heteropoly compounds of the Keggin, lacunar Keggin, substituted Keggin and Strandberg type are preferably used.

The tungsten precursors that may be used are also well known to a person skilled in the art. For example, among the sources of tungsten, the oxides and hydroxides, the tungstic acids and salts thereof can be used, in particular the ammonium salts such as ammonium tungstate, ammonium metatungstate, phosphotungstic acid and salts thereof, and optionally silicotungstic acid ($H_4SiW_{12}O_{40}$) and salts thereof. The sources of tungsten may also be any heteropoly compound of the Keggin, lacunar Keggin, substituted Keggin, or Dawson type, for example. The oxides and the ammonium salts such as ammonium metatungstate or the heteropolyanions of the Keggin, lacunar Keggin or substituted Keggin type are preferably used.

The precursors of cobalt that can be used are advantageously selected from the oxides, hydroxides, hydroxycarbonates, carbonates and nitrates, for example. Cobalt hydroxide and cobalt carbonate are preferably used.

The precursors of nickel that can be used are advantageously selected from the oxides, hydroxides, hydroxycarbonates, carbonates and nitrates, for example. Nickel hydroxide and nickel hydroxycarbonate are preferably used.

When phosphorus is present, the phosphorus can advantageously be introduced into the catalyst at various stages of its preparation and in various ways. The phosphorus can be introduced during the forming of said alumina support, or preferably after this forming. It may for example be introduced just before or just after peptization of the matrix selected, such as for example and preferably the precursor of alumina aluminium oxyhydroxide (boehmite). It may also advantageously be introduced alone or in a mixture with at least one of the group VIB and group VIII metals. The phosphorus is preferably introduced in a mixture with the precursors of the group VIB and group VIII metals, wholly or partly on the formed alumina support by dry impregnation of said alumina support using a solution containing the precursors of the metals and the precursor of phosphorus.

The preferred source of phosphorus is orthophosphoric acid $H_3PO_4$, but salts and esters thereof such as the ammonium phosphates or mixtures thereof are also suitable. The phosphorus may also be introduced at the same time as the group VIB element(s) in the form, for example, of heteropolyanions of the Keggin, lacunar Keggin, substituted Keggin or Strandberg type.

Stage c) Drying

At the end of the stage or stages of impregnation of the group VIII, group VIB metals and optionally phosphorus, the catalyst precursor is subjected to a stage c) of drying carried out by any technique known to a person skilled in the art. It is advantageously carried out at atmospheric pressure or at reduced pressure. Preferably, this stage is carried out at atmospheric pressure. This stage c) is carried out at a temperature less than 200° C., preferably comprised between 50 and 180° C., preferably comprised between 60° C. and 150° C. and very preferably comprised between 75° C. and 140° C. Stage c) is advantageously carried out in a transverse bed using air or any other hot gas. Preferably, when drying is carried out in a transverse bed, the gas used is either air, or an inert gas such as argon or nitrogen. Very preferably, drying is carried out in a transverse bed in the presence of air.

Preferably, the duration of this drying stage is comprised between 30 minutes and 4 hours and very preferably comprised between 1 hour and 3 hours.

At the end of stage c) of the process according to the invention, a dried catalyst is obtained which can be used as a hydrotreating catalyst after an activation phase (stage of sulphurization).

According to a variant, the dried catalyst can be subjected to a subsequent calcination stage d), for example under air, at a temperature greater than or equal to 200° C. The calcination is generally carried out at a temperature less than or equal to 600° C., and preferably comprised between 200° C. and 600° C., and particularly preferably comprised between 250° C. and 500° C. The duration is generally comprised between 0.5 and 16 hours, preferably between 1 hour and 5 hours. It is generally carried out under air. Calcination makes it possible to convert the precursors of the group VIB and group VIII metals to oxides.

Before the use thereof as a hydrotreating catalyst, it is advantageous to subject the dried or optionally calcined catalyst to a stage of sulphurization (activation phase). This activation phase is carried out by the methods well known to a person skilled in the art, and advantageously under a sulpho-reducing atmosphere in the presence of hydrogen and hydrogen sulphide. The sulphurized hydrogen can be used directly or generated by a sulphide agent (such as dimethyl disulphide).

According to another aspect of the invention, the hydrotreating catalyst as described above also comprises one or more organic compounds containing oxygen and/or nitrogen known for the additive role thereof. Such a catalyst is denoted by the term "additive-containing catalyst" in the remainder of the description. The organic compound present in the catalyst contains more than 2 carbon atoms and at least one oxygen and/or nitrogen atom.

The organic compound containing oxygen may be one or more selected from the compounds containing one or more chemical functions selected from a carboxyl, alcohol, ether, aldehyde, ketone, ester or carbonate function. By way of example, the organic compound containing oxygen may be one or more selected from the group constituted by ethylene glycol, diethylene glycol, triethylene glycol, a polyethylene glycol (with a molecular weight comprised between 200 and 1500 g/mol), propylene glycol, 2-butoxyethanol, 2-(2-butoxyethoxy)ethanol, 2-(2-methoxyethoxy)ethanol, triethyleneglycol dimethyl ether, glycerol, acetophenone, 2,4-pentanedione, pentanone, acetic acid, maleic acid, malic acid, malonic acid, oxalic acid, gluconic acid, tartaric acid, citric acid, γ-ketovaleric acid, a $C_1$-$C_4$ dialkyl succinate, methyl acetoacetate, ethyl acetoacetate, 2-methoxyethyl 3-oxobutanoate, 2-(methacryloyloxy)ethyl 3-oxobutanoate, dibenzofuran, a crown ether, orthophthalic acid, glucose, γ-valerolactone, 2-acetylbutyrolactone and propylene carbonate.

The organic compound containing nitrogen may be one or more selected from the compounds containing one or more chemical functions selected from an amine or nitrile function. By way of example, the organic compound containing nitrogen may be one or more selected from the group constituted by ethylenediamine, diethylenetriamine, hexamethylenediamine, triethylenetetramine, tetraethylenepentamine, pentaethylenehexamine, acetonitrile, octylamine, guanidine or a carbazole.

The organic compound containing oxygen and nitrogen may be one or more selected from the compounds comprising one or more chemical functions selected from a carboxylic acid, alcohol, ether, aldehyde, ketone, ester, carbonate, amine, nitrile, imide, amide, urea or oxime function. By way of example, the organic compound containing oxygen and nitrogen may be one or more selected from the group constituted by 1,2-cyclohexanediaminetetraacetic acid, monoethanolamine (MEA), N-methylpyrrolidone, dimethylformamide, ethylenediaminetetraacetic acid (EDTA), alanine, glycine, nitrilotriacetic acid (NTA), N-(2-hydroxyethyl)ethylenediamine-N,N',N'-triacetic acid (HEDTA), diethylenetriaminepentaacetic acid (DTPA), tetramethylurea, glutamic acid, dimethylglyoxime, bicine, tricine, or also a lactam.

Preferably, the organic compound contains oxygen; preferably it is selected from γ-valerolactone, a $C_1$-$C_4$ dialkyl succinate, 2-acetylbutyrolactone, triethylene glycol, diethylene glycol, ethylene glycol, ethylenediaminetetraacetic acid (EDTA), maleic acid, malonic acid, citric acid, γ-ketovaleric acid, dimethylformamide, N-methylpyrrolidone, propylene carbonate, 2-methoxyethyl 3-oxobutanoate, 2-(methacryloyloxy)ethyl 3-oxobutanoate, bicine, or tricine.

The molar ratio in play, of organic compound(s) containing oxygen and/or nitrogen to group VIB element(s) on the additive-containing catalyst precursor, is generally comprised between 0.05 and 9 mol/mol, preferably comprised between 0.1 and 8 mol/mol, preferably comprised between 0.2 and 7 mol/mol before the drying stage ii).

The organic compound containing oxygen and/or nitrogen can be introduced according to several embodiments during the preparation process.

According to a first embodiment, said group VIB and group VIII metal components, the organic compound and optionally phosphorus are introduced simultaneously into said support. This first embodiment comprises the utilization of one or more stages of co-impregnation, each stage of co-impregnation is preferably followed by an intermediate drying stage, generally at a temperature less than 200° C., advantageously comprised between 50 and 180° C., preferably comprised between 60 and 150° C., very preferably comprised between 75 and 140° C.

According to a second embodiment of the process for preparing the additive-containing catalyst, at least one organic compound containing oxygen and/or nitrogen is brought into contact with at least one component containing at least one group VIII metal, at least one component comprising a group VIB metal, optionally phosphorus and the support. This second embodiment is a preparation by so-called "post-impregnation of the organic compound". Preparation of the catalytic precursor comprising at least one group VIII metal, at least one group VIB metal, optionally phosphorus, and the support is carried out according to the stages b) of introducing the active phase and the stage c) of drying and optionally the stage d) of calcination described above. Said organic compound(s) can then advantageously be deposited in one or more stages either by impregnation in excess, or by dry impregnation, or by any other means known to a person skilled in the art. Preferably, introduction of the organic compound is carried out by means of a single stage of impregnation, and particularly preferably by means of a single stage of dry impregnation.

After introduction of the organic compound, the additive-containing catalyst precursor, optionally after a stage of maturation, is subjected to a drying stage at a temperature less than 200° C. The drying stage is carried out as described above.

When the catalyst comprises an organic compound, it is preferably not subjected to a stage of calcination at a temperature greater than or equal to 200° C. after introduction of the organic compound.

According to another alternative embodiment, the process of preparing the additive-containing catalyst can combine the co-impregnation of an organic compound and the post-impregnation of an organic compound which can be identical or different to that used for the co-impregnation. In this case, an organic compound is introduced containing oxygen and/or nitrogen by co-impregnation with the group VIB and VIII metal components and optionally phosphorus on the support, it is dried at a temperature less than 200° C., the or another organic compound containing oxygen and/or nitrogen is introduced on the dried catalyst precursor, and it is dried for a second time at a temperature less than 200° C. The operating conditions described above are of course applicable in the context of this embodiment.

Before its use, it is advantageous to activate the additive-containing catalyst. This activation phase corresponds to a sulphurization which is carried out by the methods well known to a person skilled in the art, and advantageously under a sulpho-reducing atmosphere in the presence of hydrogen and hydrogen sulphide.

The additive-containing catalyst obtained is therefore advantageously subjected to a stage of sulphurization, without an intermediate stage of calcination. Said additive-containing catalyst is advantageously sulphurized ex situ or in situ. The same sulfurizing agents as those described for the non additive-containing catalyst according to the invention can be used.

Hydrotreating Process

The invention also relates to a hydrotreating process for a hydrocarbon cut. In particular, the process is a hydrodesulphurization of a hydrocarbon cut having a distillation range comprised between 30 and 260° C. Preferably, this hydrocarbon cut is a cut of the gasoline type. Very preferably, the gasoline cut is an olefinic gasoline cut originating for example from a catalytic cracking unit (Fluid Catalytic Cracking).

The hydrodesulphurization process according to the invention makes it possible to convert the organo-sulphur compounds of the hydrocarbon feedstock into hydrogen sulphide ($H_2S$) while as far as possible limiting the hydrogenation of the olefins present in said feedstock.

The hydrotreating process consists of bringing the hydrocarbon cut into contact with the catalyst according to the invention and hydrogen under the following conditions:

a temperature comprised between 200 and 400° C., preferably comprised between 230 and 330° C.;

at a total pressure comprised between 1 and 3 MPa, preferably comprised between 1.5 and 2.5 MPa;

an hourly space velocity (HSV), defined as being the volume flow rate of feedstock with respect to the volume of catalyst, comprised between 1 and 10 $h^{-1}$, preferably comprised between 2 and 6 $h^{-1}$;

a ratio by volume of hydrogen/gasoline feedstock comprised between 100 and 600 Nl/l, preferably comprised between 200 and 400 Nl/l.

The process for catalytic hydrodesulphurization may be carried out in one or more reactors in series of the fixed bed type or of the ebullating bed type. If the process is carried out by means of at least two reactors in series, it is possible to provide a device for removing $H_2S$ from the effluent originating from the first hydrodesulphurization reactor before treating said effluent in the second hydrodesulphurization reactor.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding application No. FR 1762158, filed Dec. 14, 2017 are incorporated by reference herein.

EXAMPLES

Example 1 (Comparative): Preparation of High Temperature Alumina S1 Having a BET Specific Surface Area Less than 100 $m^2/g$ An alumina support is prepared by direct calcination of a precursor of alumina (boehmite) at high temperature (1000° C.). The BET surface area of the support S1 is determined with nitrogen according to the standard ASTM D3663-03. Identification of the phases and of the asymmetry of beam [440] is carried out by XRD according to the method described previously.

| Support | S1 |
|---|---|
| Phases detected by XRD | Delta, Theta and Alpha |
| Asymmetry of beam [440] | 2.3 |
| $S_{BET}$ ($m^2/g$) | 79 |
| Gamma alumina content (% by weight) | 0 |

Traces of alpha alumina are observed (of the order of less than one percent by weight of α alumina).

By using the method as described in the description of the invention, the quantity of δ alumina is estimated from a pure sample of θ alumina available from the XRD laboratory and by choosing the isolated beams of θ alumina at angles (30-35°, 51°, 73° and 108°). The relative content of theta alumina in this sample is 50% by weight.

The asymmetry of the beam [440] indicates the absence of gamma alumina. The support is therefore composed of 50% by weight of theta alumina and 50% by weight of delta alumina.

Example 2 (Comparative): Preparation of Low Temperature Alumina S2 Having a BET Specific Surface Area Greater than 100 m²/g An alumina support is prepared by direct calcination of a precursor of alumina (boehmite) at low temperature (540° C.). The BET surface area of the support S2 is determined with nitrogen according to the standard ASTM D3663-03. XRD analysis does not show θ and α phases. The asymmetry of the beam [440] is 1.25. This sample is therefore composed of 82% by weight of γ alumina.

| Support | S2 |
|---|---|
| $S_{BET}$ (m²/g) | 264 |
| Gamma alumina content (% by weight) | 82 |

Example 3 (According to the Invention): Preparation of Low Temperature Alumina S3 Having a BET Specific Surface Area Less than 100 m²/g An alumina support is prepared by dry impregnation of extrudates of gamma alumina with 1% of acetic acid, followed by autoclaving at 180° C. for 8 hours, then a low temperature calcination (700° C.). The BET surface area of the support S3 is determined with nitrogen according to the standard ASTM D3663-03. XRD analysis does not show θ and α phases. The asymmetry of the beam [440] is 1.36. This sample is therefore composed of 74% by weight of γ alumina.

| Support | S3 |
|---|---|
| $S_{BET}$ (m²/g) | 79 |
| Gamma alumina content (% by weight) | 74 |

Example 4 (According to the Invention): Preparation of Low Temperature Alumina S4 Having a BET Specific Surface Area at 120 m²/g An alumina support is prepared by heat treatment at 225° C. for 6 hours of a boehmite powder at 10% by weight in suspension in water. The solid is then separated by filtration then subjected to a low temperature calcination (600° C.). The BET surface area of the support S4 is determined with nitrogen according to the standard ASTM D3663-03. XRD analysis does not show θ and α phases. The asymmetry of the beam [440] is 1.20. This sample is composed of 87% of γ alumina.

| Support | S4 |
|---|---|
| $S_{BET}$ (m²/g) | 120 |
| Gamma alumina content (% by weight) | 87 |

Example 5 (According to the Invention): Preparation of Low Temperature Alumina S5 Having a BET Specific Surface Area Less than 100 m²/g A solution of aluminium tri-n-hexanolate is hydrolyzed at 90° C. by the addition of water. The hexanol is then removed by azeotropic distillation. The residue is heated at 110° C. for 24 hours in a reactor. The solid is then separated by filtration then subjected to a low temperature calcination (700° C.).

The BET surface area of the support S5 is determined with nitrogen according to the standard ASTM D3663-03. XRD analysis does not show θ and α phases. The asymmetry of the beam [440] is 1.26. This sample is therefore composed of 82% by weight of γ alumina.

| Support | S5 |
|---|---|
| $S_{BET}$ (m²/g) | 95 |
| Gamma alumina content (% by weight) | 82 |

Example 6 (According to the Invention): Preparation of Low Temperature Alumina S6 Having a BET Specific Surface Area Less than 100 m²/g A soda solution is added to an aluminium chloride solution in water. The reaction medium is heated at 200° C. for 24 h. The solid is then separated by filtration then subjected to a low temperature calcination (560° C.).

The BET surface area of the support S6 is determined with nitrogen according to the standard ASTM D3663-03. XRD analysis does not show θ and α phases. The asymmetry of the beam [440] is 1.10. This sample is therefore composed of 95% by weight of γ alumina.

| Support | S6 |
|---|---|
| $S_{BET}$ (m²/g) | 97 |
| Gamma alumina content (% by weight) | 95 |

Example 7 (Comparative): Synthesis of a CoMo/Alumina A1 Catalyst with a Low Surface Density of Molybdenum The catalyst A1 is obtained by dry impregnation of an aqueous solution prepared from molybdenum oxide, cobalt hydroxide, phosphoric acid and citric acid, the volume of said solution containing the precursors of cobalt, molybdenum and phosphorus and the citric acid organic additive being strictly equal to the pore volume of the solid alumina support S1. The concentrations of precursors and of organic additive in the aqueous solution are adjusted so as to deposit on the alumina support the weight contents of Co, Mo and P in order to obtain a fixed surface density of molybdenum of 4.5 atoms of molybdenum per nm² of catalyst, Co/Mo and P/Mo atomic ratios equal to 0.4 and 0.55 respectively and an additive/Mo molar ratio equal to 1. After a stage of maturation for 12 hours, the solid is dried for 12 hours at 120° C.

| Catalyst | A1 |
|---|---|
| Support | S1 |
| $S_{BET}$ (m²/g-catalyst) | 70 |
| Asymmetry of the beam 440 | 2.35 |
| CoO (% by weight) | 1.6 |
| MoO₃ (% by weight) | 7.7 |
| P₂O₅ (% by weight) | 2.1 |

Example 8 (Comparative): Synthesis of a CoMo/Alumina A2 Catalyst with a High Surface Density of Molybdenum The catalyst A2 is obtained by dry impregnation of an aqueous solution prepared from molybdenum oxide, cobalt hydroxide, phosphoric acid and citric acid, the volume of said solution containing the precursors of cobalt, molybdenum and phosphorus and the citric acid organic additive being strictly equal to the pore volume of the solid alumina support S2. The concentrations of precursors and of organic additive in the aqueous solution are adjusted so as to deposit on the alumina support the weight contents of Co, Mo and P in order to obtain a surface density of molybdenum fixed at 5.2 atoms of molybdenum per nm$^2$ of catalyst, Co/Mo and P/Mo atomic ratios equal to 0.4 and 0.55 respectively and an additive/Mo molar ratio equal to 1. After a stage of maturation for 12 hours, the solid is dried for 12 hours at 120° C.

| Catalyst | A2 |
|---|---|
| Support | S2 |
| $S_{BET}$ (m$^2$/g-catalyst) | 178 |
| Asymmetry of the beam 440 | 1.29 |
| CoO (% by weight) | 4.5 |
| MoO$_3$ (% by weight) | 22.0 |
| P$_2$O$_5$ (% by weight) | 6.0 |

Example 9: Synthesis of the CoMo/Alumina A3 Catalyst (According to the Invention)

The catalyst A3 is obtained by dry impregnation of an aqueous solution prepared from molybdenum oxide, cobalt hydroxide, phosphoric acid and citric acid, the volume of said solution containing the precursors of cobalt, molybdenum and phosphorus and the citric acid organic additive being strictly equal to the pore volume of the solid alumina support S3. The concentrations of precursors and of organic additive in the aqueous solution are adjusted so as to deposit on the alumina support the weight content of Co, Mo and P in order to obtain a fixed surface density of molybdenum of 7 atoms of molybdenum per nm$^2$ of catalyst, Co/Mo and P/Mo atomic ratios equal to 0.4 and 0.55 respectively and an additive/Mo molar ratio equal to 1. After a stage of maturation for 12 hours, the solid is dried for 12 hours at 120° C.

| Catalyst | A3 |
|---|---|
| Support | S3 |
| $S_{BET}$ (m$^2$/g-catalyst) | 66 |
| Asymmetry of the beam 440 | 1.40 |
| CoO (% by weight) | 2.3 |
| MoO$_3$ (% by weight) | 11.1 |
| P$_2$O$_5$ (% by weight) | 3.0 |

Example 10: Synthesis of the CoMo/Alumina A4 Catalyst without Additive (According to the Invention)

Catalyst A4 is obtained by dry impregnation of an aqueous solution prepared from molybdenum oxide, cobalt hydroxide and phosphoric acid, the volume of said solution containing the precursors of cobalt, molybdenum and phosphorus being strictly equal to the pore volume of the solid alumina support S5. The concentrations of precursors in the solution are adjusted so as to deposit on the alumina support the weight contents of Co, Mo and P in order to obtain a fixed surface density of molybdenum of 4.5 atoms of molybdenum per nm$^2$ of catalyst, Co/Mo and P/Mo atomic ratios equal to 0.4 and 0.32 respectively. After a stage of maturation for 12 hours, the solid is dried for 12 hours at 120° C. then calcined for 4 h at 450° C.

| Catalyst | A4 |
|---|---|
| Support | S5 |
| $S_{BET}$ (m$^2$/g-catalyst) | 83 |
| Asymmetry of the beam 440 | 1.26 |
| CoO (% by weight) | 1.9 |
| MoO$_3$ (% by weight) | 9.0 |
| P$_2$O$_5$ (% by weight) | 1.4 |

Example 11: Assessment of Catalysts A1, A2, A3 and A4

A model feedstock representative of a catalytic cracking (FCC) gasoline containing 10% by weight of 2,3-dimethylbut-2-ene and 0.33% by weight of 3-methylthiophene (i.e. 1000 ppm by weight of sulphur in the feedstock) is used for the assessment of the catalytic performances of the different catalysts. The solvent used is heptane.

The hydrodesulphurization reaction (HDS) is carried out in a traverse fixed-bed reactor under a total pressure of 1.5 MPa, 210° C., HSV=6 h$^{-1}$ (HSV=volume flow rate of feedstock/volume of catalyst) in the presence of 4 mL of catalyst. Prior to the HDS reaction, the catalyst is sulphurized in-situ at 450° C. for 2 hours under a flow of H$_2$ containing 15% mol of H$_2$S at atmospheric pressure.

Each of the catalysts are successively placed in said reactor. Samples are taken at different time intervals and are analysed by gas phase chromatography so as to observe the disappearance of the reagents and the formation of the products.

The catalytic performances of the catalysts are assessed from the catalytic activity and the selectivity.

The HDS activity is expressed from the velocity constant for the HDS reaction of 3-methylthiophene (kHDS), normalized by volume of catalyst introduced, assuming a kinetic of order 1 with respect to the sulphurized compound.

The HydO activity is expressed from the velocity constant for the hydrogenation reaction of the olefin (HydO), namely in the present case for the hydrogenation reaction of 2,3-dimethylbut-2-ene, normalized by volume of catalyst introduced, assuming a kinetic of order 1 with respect to the olefin.

The selectivity of the catalyst is expressed as the normalized ratio of the velocity constants kHDS/kHydO. The more selective the catalyst, the higher will be the kHDS/kHydO ratio, meaning a limited hydrogenation of 2,3-dimethylbut-2-ene. An increase in the kHDS/kHydO ratio is therefore favourable for the quality of the gasoline obtained at the end of the hydrodesulphurization reaction, given that as the hydrogenation of the olefins was limited, the drop in octane number of the resultant gasoline is greatly minimized.

The HDS activity and the selectivity of the catalysts are given in the following table. The values are normalized by taking catalyst A1 as reference, i.e. the HDS activity and the selectivity of catalysts A2, A3 and A4 are compared relative to those of catalyst A1 for which the HDS activity and the selectivity are set at 100. It is observed that the catalysts according to the invention show an increase in selectivity while maintaining the activity.

Relative selectivity and activity of catalysts A1, A2 and A3.

| | Catalysts | | | |
|---|---|---|---|---|
| | A1 (comp) | A2 (comp) | A3 (inv) | A4 (inv) |
| $S_{BET}$ (m$^2$/g of catalyst) | 70 | 178 | 66 | 83 |
| Asymmetry of beam 440 | 2.35 | 1.29 | 1.40 | 1.26 |
| Gamma alumina content (% by weight) | 0 | 82 | 74 | 82 |
| Relative HDS activity | 100 | 230 | 100 | 103 |
| Relative selectivity | 100 | 78 | 142 | 114 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A hydrotreating catalyst comprising 3 to 35% by weight as oxide with respect to total weight of support of at least one group VIB metal, 0.1 to 10% by weight as oxide with respect to total weight of the catalyst of at least one group VIII metal and an alumina support comprising gamma alumina and delta, theta and/or alpha alumina, said alumina support having a gamma alumina content of 60% to 95% by weight with respect to the weight of the support, said support having a specific surface area of 60 to 100 m$^2$/g, said catalyst having a specific surface area of 50 to 90 m$^2$/g.

2. The catalyst according to claim 1, in which the molar ratio (group VIII metal)/(group VIB metal) is 0.1 to 0.8.

3. The catalyst according to claim 1, further comprising 0.3 to 10% by weight phosphorus, expressed as P$_2$O$_5$ with respect to the total weight of the catalyst" the catalyst having a molar ratio of phosphorus/(group VIB metal) of 0.1 to 0.7.

4. The catalyst according to claim 1, having a density of group VIB metal, expressed as the number of atoms of group VIB metal per unit of area of the catalyst of 3 to 30 atoms of group VIB metal per nm$^2$ of catalyst.

5. The catalyst according to claim 1, in which the group VIB metal is tungsten or molybdenum and the group VIII metal is nickel or cobalt.

6. The catalyst according to claim 1, in which the alumina support is obtained by heat treatment at a temperature less than or equal to 770° C. from a precursor of alumina.

7. The catalyst according to claim 1, also comprising at least one organic compound containing oxygen and/or nitrogen.

8. The catalyst according to claim 7, in which the organic compound is a carboxylic acid, an alcohol, an aldehyde, an ester, an amine, an amino carboxylic acid, an amino alcohol, a nitrile or an amide.

9. The catalyst according to claim 8, in which the organic compound is γ-valerolactone, 2-acetylbutyrolactone, triethylene glycol, diethylene glycol, ethylene glycol, ethylenediaminetetraacetic acid (EDTA), maleic acid, malonic acid, citric acid, γ-ketovaleric acid, dimethylformamide, N-methylpyrrolidone, propylene carbonate, 2-methoxyethyl 3-oxobutanoate, 2-(methacryloyloxy)ethyl 3-oxobutanoate, bicine, or tricine.

10. The catalyst according to claim 1, that is sulphurized.

11. A process for preparing the hydrotreating catalyst according to claim 1 comprising the following stages:
   a) carrying out a heat treatment at a temperature less than or equal to 770° C. of a precursor of alumina so as to obtain a support having a gamma alumina content 60-95% by weight with respect to the weight of the support, said support having a specific surface area of 60-100 m$^2$/g,
   b) bringing at least one component of a group VIB metal, at least one component of a group VIII metal and optionally phosphorus into contact with said support, so as to obtain a catalyst precursor having 3-35% by weight of oxide of said group VIB metal with respect to total weight of the catalyst and 0.1-10% by weight of oxide of said group VIII metal with respect to the total weight of the catalyst,
   c) drying said catalyst precursor originating from stage b) at a temperature less than 200° C.

12. The process according to claim 11, in which the stage a) of heat treatment is carried out from a precursor of alumina containing at least 50% by weight of boehmite AlOOH with respect to the total weight of the precursor of alumina.

13. The process for preparing a catalyst according to claim 11, also comprising a stage of calcination d) at a temperature of 200° C. to 600° C. carried out after stage c).

14. The process for preparing a catalyst according to claim 11, also comprising a stage of sulphurization carried out after stage c) or d).

15. A process for the hydrodesulphurization of a gasoline cut comprising contacting said gasoline cut, hydrogen and a catalyst according to claim 1, said catalyst being sulphurized contacting being carried out at:
   a temperature of 200° C. to 400° C.;
   a total pressure of 1 to 3 M pa;
   an hourly space velocity, defined as being the volume flow rate of feedstock with respect to the volume of catalyst, of 1 to 10 h$^{-1}$;
   a ratio by volume of hydrogen/gasoline feedstock of 100 to 600 Nl/l.

16. The process according to claim 15, in which the gasoline cut is a gasoline originating from a catalytic cracking unit.

* * * * *